(12) United States Patent
Nishidate et al.

(10) Patent No.: US 12,211,412 B2
(45) Date of Patent: Jan. 28, 2025

(54) DISPLAY APPARATUS, DISPLAY METHOD, AND COMPUTER PROGRAM

(71) Applicant: Sony Interactive Entertainment Inc., Tokyo (JP)

(72) Inventors: Masaomi Nishidate, Tokyo (JP); Hideki Mori, Tokyo (JP)

(73) Assignee: Sony Interactive Entertainment Inc., Tokyo (JP)

(*) Notice: Subject to any disclaimer, the term of this patent is extended or adjusted under 35 U.S.C. 154(b) by 182 days.

(21) Appl. No.: 17/802,696

(22) PCT Filed: Mar. 18, 2020

(86) PCT No.: PCT/JP2020/012130
§ 371 (c)(1),
(2) Date: Aug. 26, 2022

(87) PCT Pub. No.: WO2021/186646
PCT Pub. Date: Sep. 23, 2021

(65) Prior Publication Data
US 2023/0148052 A1 May 11, 2023

(51) Int. Cl.
*G09G 5/00* (2006.01)
*G09G 3/00* (2006.01)
(52) U.S. Cl.
CPC .................................... *G09G 3/03* (2020.08)
(58) Field of Classification Search
CPC ....................................................... G09G 3/03
USPC ........................................................ 345/443
See application file for complete search history.

(56) References Cited

U.S. PATENT DOCUMENTS

| | | | |
|---|---|---|---|
| 10,091,417 B2 | 10/2018 | Kimura | |
| 2013/0212525 A1* | 8/2013 | Shogaki | H04N 1/00469 715/799 |
| 2014/0157189 A1* | 6/2014 | Morita | G06F 3/0485 715/784 |
| 2015/0124049 A1 | 5/2015 | Kimura | |

(Continued)

FOREIGN PATENT DOCUMENTS

| | | |
|---|---|---|
| JP | 2003344962 A | 12/2003 |
| JP | 2015156523 A | 8/2015 |
| WO | 2019202935 A1 | 10/2019 |

OTHER PUBLICATIONS

Notice of Reasons for Refusal for corresponding JP Application No. 2022-507937, 6 pages, dated Aug. 28, 2023.

(Continued)

*Primary Examiner* — Jin Ge
(74) *Attorney, Agent, or Firm* — Kilpatrick Townsend & Stockton LLP

(57) ABSTRACT

An App image includes a display target area displayed on a cylindrical screen, a left margin area, and a right margin area. When a particle comes into contact with a boundary of the display target area and the right margin area, a display apparatus arranges, in the left margin area, a particle in the same mode as the mode of the particle such that the particle comes into contact with a boundary of the display target area and the left margin area. The display apparatus generates a plurality of images such that as the particle moves out to the right margin area from the display target area, the particle enters the display target area from the left margin area.

18 Claims, 6 Drawing Sheets

(56) References Cited

U.S. PATENT DOCUMENTS

2016/0191680 A1* 6/2016 Jung .................. G06F 3/0482
  455/575.1
2016/0314752 A1* 10/2016 Nakano ............... G09G 3/3611
2021/0116798 A1  4/2021 Nakamura

OTHER PUBLICATIONS

International Search Report for corresponding PCT Application No. PCT/JP2020/012130, 4 pages, dated Jun. 9, 2020.

* cited by examiner

DISPLAY APPARATUS, DISPLAY METHOD, AND COMPUTER PROGRAM

TECHNICAL FIELD

The invention relates to a data processing technique, and particularly, to a display apparatus, a display method, and a computer program.

BACKGROUND ART

A cylindrical transparent screen display that can display a video 360 degrees has been proposed.

SUMMARY

Technical Problem

When an image drawn on a plane including a moving object is displayed on a cylindrical screen, the display of the object at a boundary corresponding to both ends of the image becomes unnatural in some cases.

The present invention has been made in view of the problem, and one object of the present invention is to provide a technique for reducing unnaturalness of image display in a cylindrical screen.

Solution to Problem

To solve the problem, an aspect of the present invention provides a display apparatus including a generation unit that generates an image provided with a movement object as an object that moves, the image including a display target area displayed on a cylindrical screen, a first margin area provided outside of one end of the display target area, and a second margin area provided outside of an end on an opposite side of the one end of the display target area, and a display control unit that causes the cylindrical screen to sequentially display content of the display target area of a plurality of images generated by the generation unit. When a first movement object that moves in the display target area comes into contact with a boundary of the display target area and the first margin area, the generation unit arranges, in the second margin area, a second movement object in a same mode as a mode of the first movement object such that the second movement object comes into contact with a boundary of the display target area and the second margin area, and the generation unit generates the plurality of images such that as the first movement object moves out to the first margin area from the display target area, the second movement object enters the display target area from the second margin area.

Another aspect of the present invention also provides a display apparatus. The apparatus includes a generation unit that generates an image provided with a movement object as an object that moves and a trail object indicating a trajectory of the movement of the movement object, the image including a display target area displayed on a cylindrical screen, a first margin area provided outside of one end of the display target area, and a second margin area provided outside of an end on an opposite side of the one end of the display target area, and a display control unit that causes the cylindrical screen to sequentially display content of the display target area of a plurality of images generated by the generation unit. A width of the movement object is equal to or smaller than a width of the trail object, when a first movement object that moves in the display target area comes into contact with a boundary of the display target area and the first margin area, the generation unit is configured to arrange, in the second margin area, a second movement object in a same mode as a mode of the first movement object such that the second movement object comes into contact with a boundary of the display target area and the second margin area, and delete the first movement object, after deleting the first movement object, the generation unit gradually shortens the trail object added to the first movement object up to that time and generates a plurality of images such that the second movement object enters the display target area from the second margin area, and when the entire second movement object enters the display target area from the second margin area, the generation unit starts to generate a trail object to be added to the second movement object.

Yet another aspect of the present invention provides a display method. The method is executed by a display apparatus, the display apparatus executing a step of generating an image provided with a movement object as an object that moves, the image including a display target area displayed on a cylindrical screen, a first margin area provided outside of one end of the display target area, and a second margin area provided outside of an end on an opposite side of the one end of the display target area, a step of causing the cylindrical screen to sequentially display, content of the display target area of a plurality of images generated in the step of generating, in which in the step of generating, when a first movement object that moves in the display target area comes into contact with a boundary of the display target area and the first margin area, the display apparatus arranges, in the second margin area, a second movement object in a same mode as a mode of the first movement object such that the second movement object comes into contact with a boundary of the display target area and the second margin area, and in the step of generating, the display apparatus generates the plurality of images such that as the first movement object moves out to the first margin area from the display target area, the second movement object enters the display target area from the second margin area.

Yet another aspect of the present invention also provides a display method. The method is executed by a display apparatus, the display apparatus executing a step of generating an image provided with a movement object as an object that moves and a trail object indicating a trajectory of the movement of the movement object, the image including a display target area displayed on a cylindrical screen, a first margin area provided outside of one end of the display target area, and a second margin area provided outside of an end on an opposite side of the one end of the display target area, and a step of sequentially displaying, on the cylindrical screen, content of the display target area of a plurality of images generated in the step of generating, in which a width of the movement object is equal to or smaller than a width of the trail object, in the step of generating, when a first movement object that moves in the display target area comes into contact with a boundary of the display target area and the first margin area, the display apparatus is configured to arrange, in the second margin area, a second movement object in a same mode as a mode of the first movement object such that the second movement object comes into contact with a boundary of the display target area and the second margin area, and delete the first movement object, in the step of generating, after deleting the first movement object, the display apparatus gradually shortens the trail object added to the first movement object up to that time and generates a plurality of images such that the second movement object enters the display target area from the second margin area, and in the step of generating, when the entire second movement object enters the display target area from the second margin area, the display apparatus starts to generate a trail object to be added to the second movement object.

Note that any combination of the constituent elements as well as expressions obtained by converting the expressions of the present invention among systems, programs, recording media storing programs, and the like are also effective as aspects of the present invention.

Advantageous Effect of Invention

According to the present invention, unnaturalness of image display in a cylindrical screen can be reduced.

DESCRIPTION OF EMBODIMENTS

First Embodiment

Figure 1:
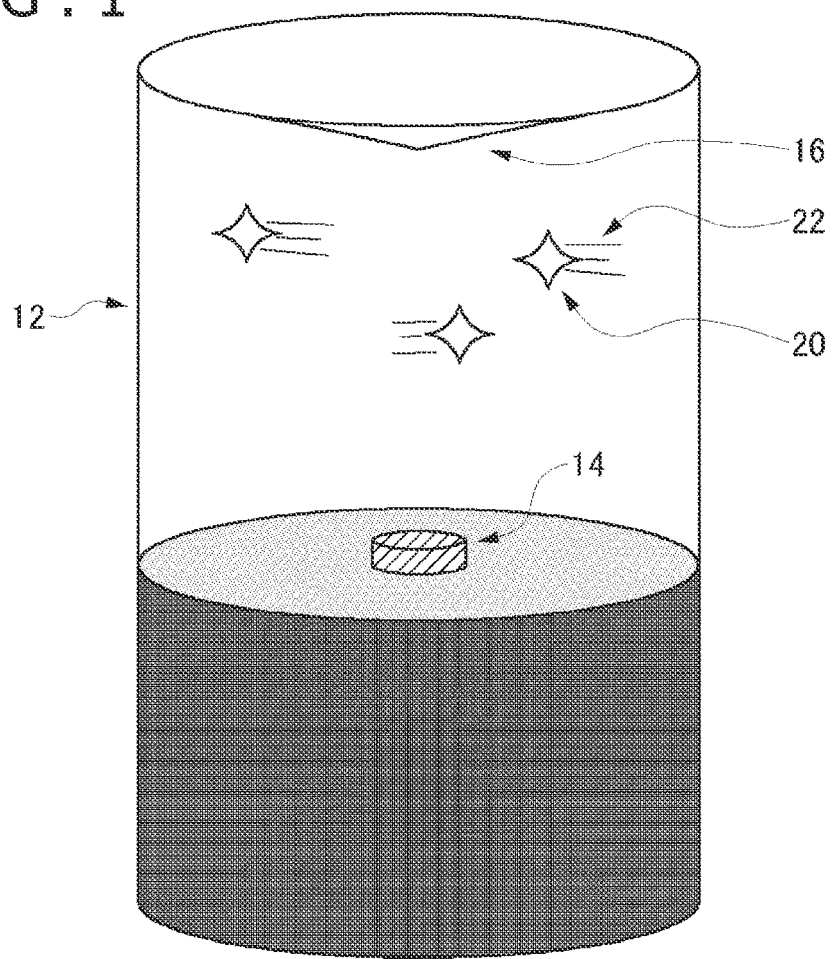
FIG. 1 is a diagram illustrating an appearance of a display apparatus of a first embodiment.

FIG. 1 illustrates an appearance of a display apparatus 10 of a first embodiment. The display apparatus 10 is a cylindrical transparent screen display that can display a video 360 degrees with a hologram screen technique. The display apparatus 10 is a display that can project a video onto a cylindrical transparent screen 12 to allow enjoying the video from anywhere around 360 degrees.

The display apparatus 10 includes a projector 14 and a mirror 16. The projector 14 projects light of an image (video) upward. The mirror 16 reflects the light projected from the projector 14 to the screen 12 to project the image (video) onto the screen 12.

The image (video) projected onto the screen 12 includes a particle 20 and a trail 22. The particle 20 is an object that moves in a virtual space, and the particle 20 in the embodiment is a drawing object indicating a particle of light flying around in the space. The trail 22 is an object that follows the particle 20 to move in the space, and the trail 22 in the embodiment is a drawing object indicating a trajectory of the movement of the particle 20. The display apparatus 10 causes the screen 12 to display the image (video), in which the particle 20 and the trail 22 continue to rotate in the cylinder according to the motion of the hand of the user imaged by a camera not illustrated.

Figure 2:
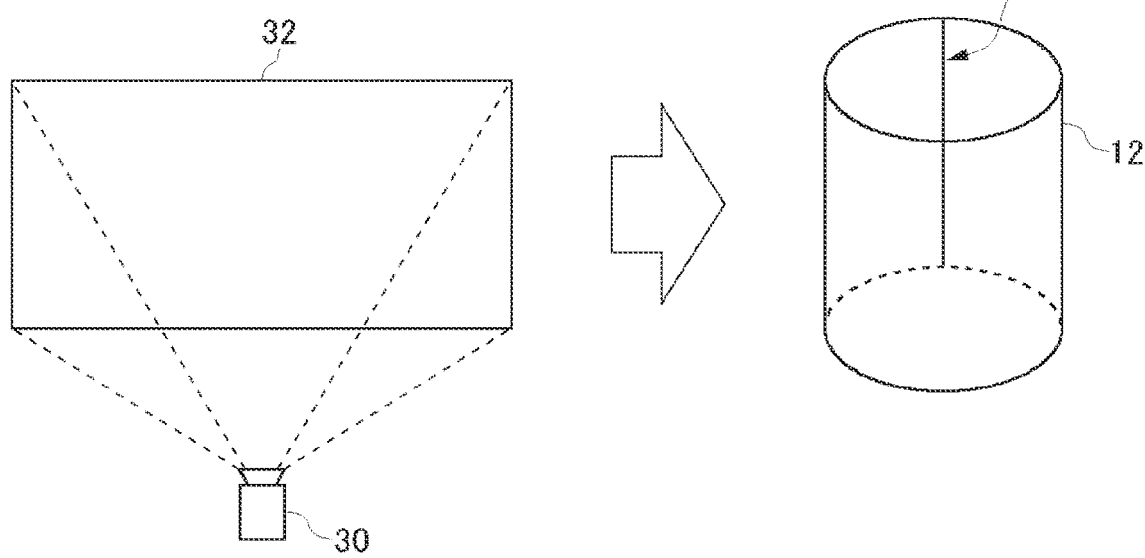
FIG. 2 is a diagram schematically illustrating a relation between an image and a cylindrical screen that displays the image.

FIG. 2 schematically illustrates a relation between the image and the cylindrical screen that displays the image. As illustrated on the left side of FIG. 2, an application that generates the image generates a plane image 32 illustrating an appearance from the viewpoint of a virtual camera 30 installed at a certain position. The display apparatus 10 projects the plane image onto the cylindrical screen 12 as if the plane image 32 is rolled up in a cylindrical shape as illustrated on the right side of FIG. 2. Therefore, the image displayed on the screen 12 of the display apparatus 10 actually includes a boundary 36 that is a joint part of a left end and a right end of the plane image 32.

In the past, the display of the particle 20 and the trail 22 becomes unnatural in some cases when the particle 20 and the trail 22 are moved across the boundary 36. For example, the display of the particle 20 and the trail 22 are interrupted for a moment, or the display is lagged in some cases. In the embodiment, a technique for reducing the unnaturalness of the image display in the cylindrical screen 12 is proposed.

Figure 3:
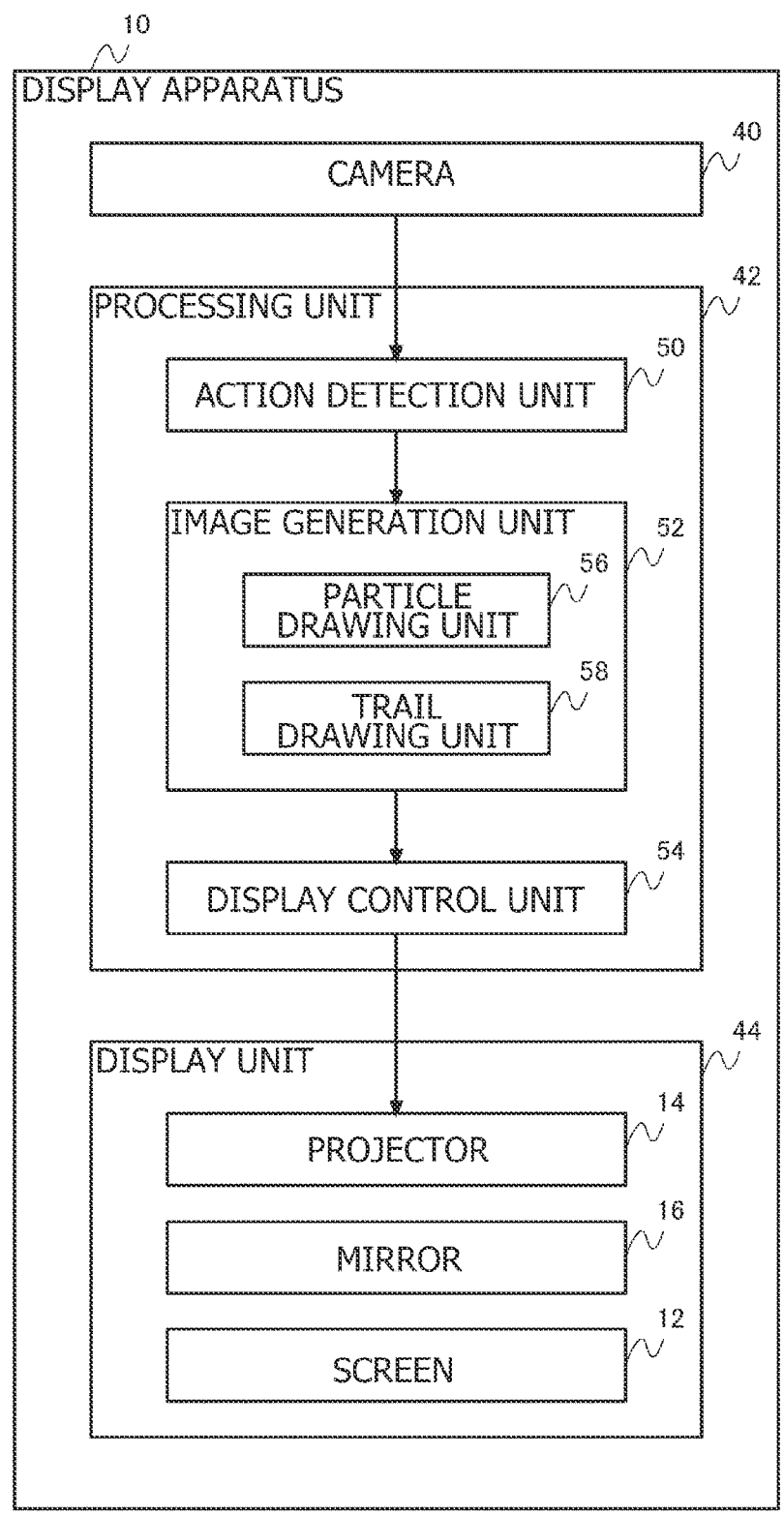
FIG. 3 is a block diagram illustrating functional blocks of the display apparatus of the first embodiment.

FIG. 3 is a block diagram illustrating functional blocks of the display apparatus 10 of the first embodiment. Each block illustrated in block diagrams of the present specification can be realized by a processor of a computer, a central processing unit (CPU), an element and an electronic circuit, such as a memory, and a mechanical apparatus in terms of hardware and can be realized by a computer program and the like in terms of software. Here, functional blocks realized by cooperation between hardware and software are depicted. Therefore, those skilled in the art will understand that the functional blocks can be realized in various forms based on combinations of hardware and software.

The display apparatus 10 includes a camera 40, a processing unit 42, and a display unit 44. The camera 40 images the user near the display apparatus 10. The display unit 44 includes the screen 12, the projector 14, and the mirror 16 already described in relation to FIG. 1. The processing unit 42 executes data processing for displaying the particle 20 and the trail 22 on the screen 12 according to the motion of the hand of the user imaged by the camera 40.

The processing unit 42 includes an action detection unit 50, an image generation unit 52, and a display control unit 54. A computer program with functions of the plurality of functional blocks may be stored in a predetermined recording medium, and the computer program may be installed on a storage of the display apparatus 10 through the recording medium. Alternatively, the computer program may be downloaded through a network and installed on the storage of the display apparatus 10. A CPU of the display apparatus 10 may read out the computer program to a main memory and execute the computer program to fulfill the functions of the plurality of functional blocks.

The action detection unit 50 detects the motion of the hand of the user based on the image of the user output from the camera 40. For example, the action detection unit 50 detects that the hand of the user has moved to the left or to the right.

Figure 4A:
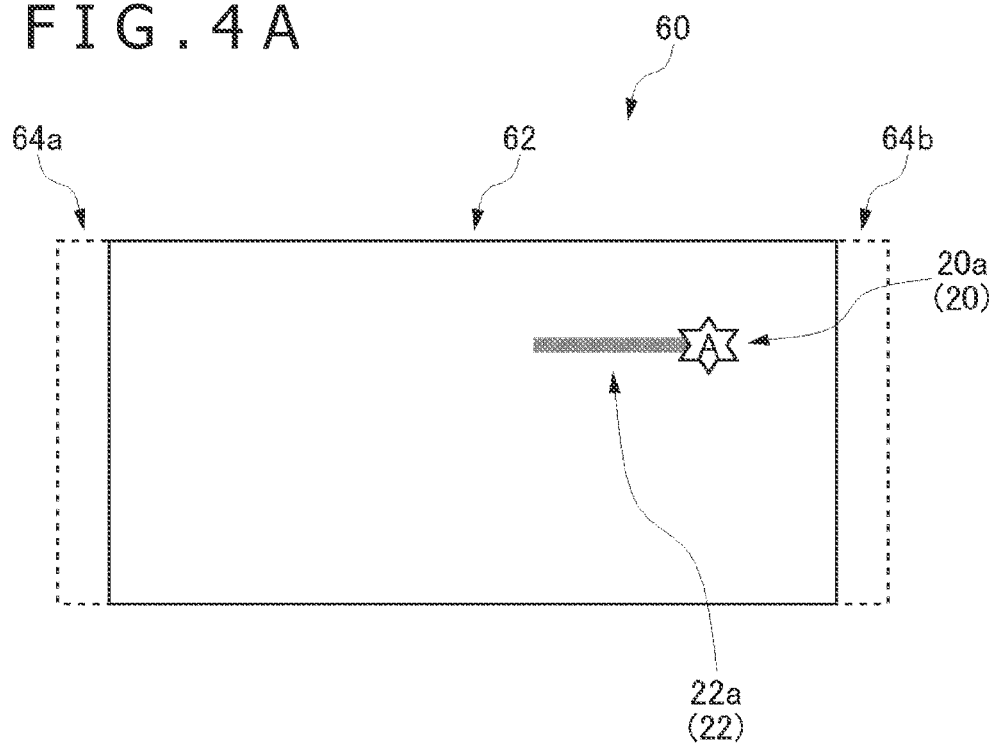
FIG. 4A is a diagram illustrating an example of an App image.

The image generation unit 52 generates an image to be projected onto the cylindrical screen 12, the image including the particle 20 and the trail 22. The image generated by the image generation unit 52 will also be referred to as an "App image." FIG. 4A illustrates an example of the App image. An App image 60 includes a display target area 62, a left margin area 64a, and a right margin area 64b. The display target area 62 is an area to be displayed in the screen 12. The left margin area 64a is an area provided outside a left end of the display target area 62. The right margin area 64b is an area provided outside a right end of the display target area 62. The length of the width (horizontal width in the first embodiment) of the left margin area 64a and the right margin area 64b is the same as the length of the width (horizontal width in the first embodiment) of the particle 20.

For a plurality of App images 60 sequentially generated by the image generation unit 52, the display control unit 54 causes the screen 12 to sequentially display the content of the display target areas 62 of the plurality of App images 60. For example, the display control unit 54 may output, to the projector 14, a signal for instructing to project the content of the display target area 62 of each of the App images 60, and the projector 14 may sequentially project, onto the screen 12, the content of the display target area 62 of each of the App images 60 instructed from the display control unit 54. In this way, a video of the particle 20 and the trail 22 flying around is displayed on the screen 12.

The image generation unit 52 includes a particle drawing unit 56 and a trail drawing unit 58. The particle drawing unit 56 arranges the particle 20 in the display target area 62 based on the motion of the hand of the user detected by the action detection unit 50. For example, when a movement of the hand of the user to the right is detected, the particle drawing unit 56 gradually shifts the arrangement position of the particle 20 to the right across a plurality of App images 60 to generate a video in which the particle 20 moves to the right.

The trail drawing unit 58 monitors the motion of the particle 20 across a plurality of App images 60 and arranges, in the display target area 62, the trail 22 indicating the trajectory of the movement of the particle 20, in a mode of adding the trail 22 to the particle 20. The maximum length of the particle 20 is set in advance. When there are a plurality of particles 20 in the display target area 62, the trail drawing unit 58 adds the trail 22 to each of the plurality of particles 20.

FIG. 4A illustrates the App image 60 typically generated when the user moves the hand to the right. A trail 22a in FIG. 4A indicates that a particle 20a has moved to the right. In the App image 60 generated next following the App image 60 of FIG. 4A, the particle 20a and the trail 22a are displayed at positions shifted to the right from the positions illustrated in FIG. 4A. Note that the App image 60 may include a plurality of particles 20 and a plurality of trails 22, or a plurality of particles 20 and a plurality of trails 22 may be newly generated according to one action of the user.

Figure 4B:
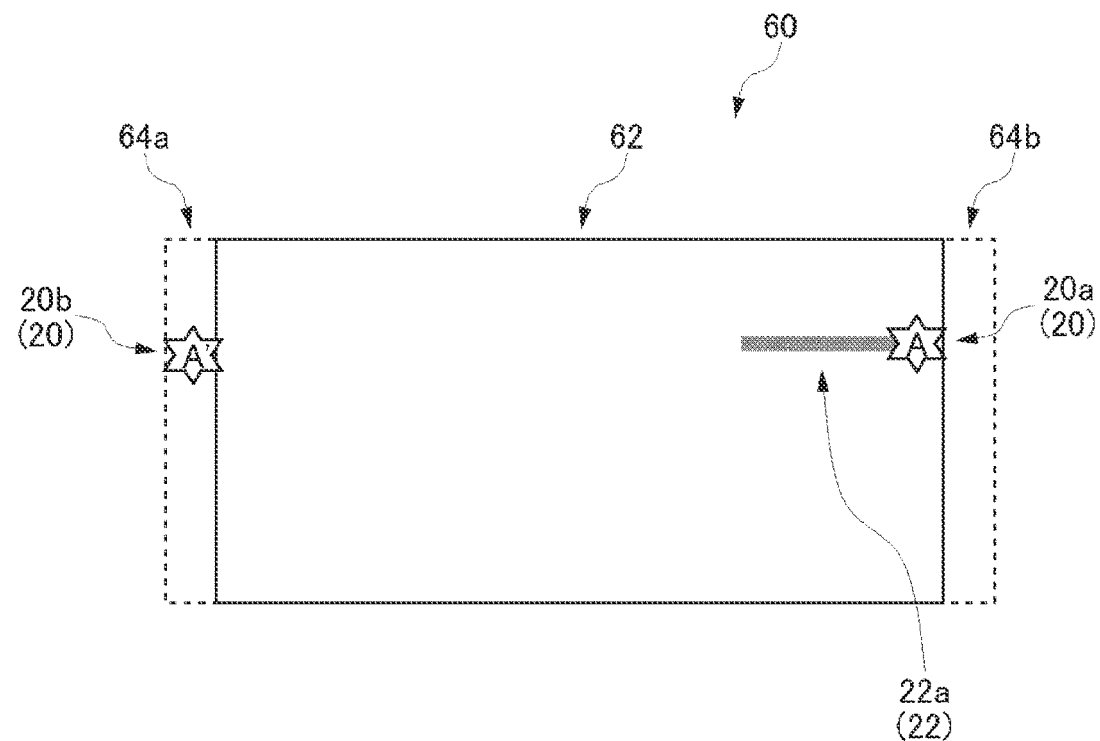
FIG. 4B is a diagram illustrating an example of the App image.

FIG. 4B also illustrates an example of the App image. When the particle 20a moving in the display target area 62 comes into contact with a boundary (hereinafter, also referred to as "right boundary") of the display target area 62 and the right margin area 64b, in other words, when the right end coordinates of the particle 20a coincide with the coordinates of the right boundary, the particle drawing unit 56 arranges, in the left margin area 64a, a particle 20b in the same mode as the mode of the particle 20a such that the particle 20b comes into contact with a boundary (hereinafter, also referred to as "left boundary") of the display target area 62 and the left margin area 64a. That is, the particle drawing unit 56 arranges the particle 20b in the left margin area 64a such that the right end coordinates of the particle 20b coincide with the coordinates of the left boundary. The ordinate of the particle 20a and the ordinate of the particle 20b are the same. In addition, the particle 20b may have the same shape, pattern, and color as those of the particle 20a, or the particle 20b may be a copied image of the particle 20a.

The particle drawing unit 56 arranges the particle 20a and the particle 20b at positions moved in the same mode (same direction and same speed), across a plurality of App images 60 following the App image 60 of FIG. 4B. The particle drawing unit 56 generates the plurality of App images 60 such that as the particle 20a enters the right margin area 64b from the display target area 62 (that is, gradually hidden), the particle 20b enters the display target area 62 from the left margin area 64a (that is, the displayed part is expanded). Until the entire particle 20a enters the right margin area 64b from the display target area 62, that is, until the entire particle 20b enters the display target area 62 from the left margin area 64a, the trail generation function for the particle 20b is not enabled.

Figure 4C:
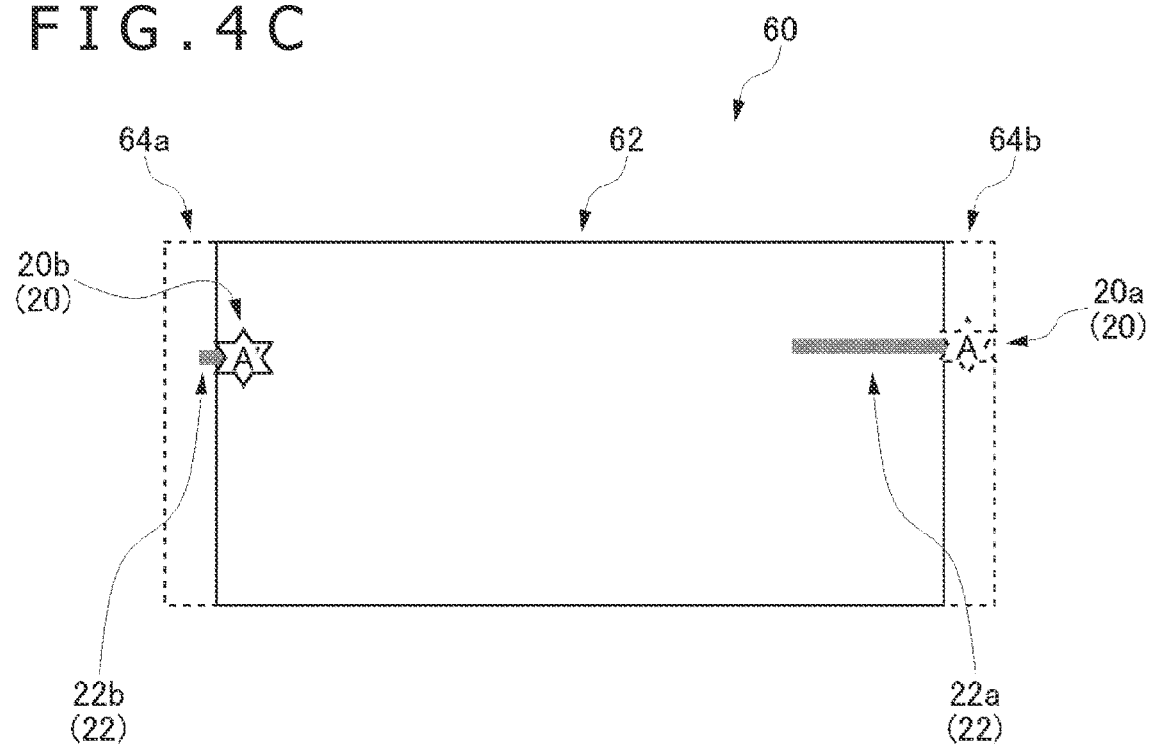
FIG. 4C is a diagram illustrating an example of the App image.

FIG. 4C also illustrates an example of the App image. As illustrated in FIG. 4C, the particle drawing unit 56 ends drawing the particle 20a, that is, deletes the particle 20a from the App images 60 generated subsequently, when the entire particle 20a enters the right margin area 64b from the display target area 62. The trail drawing unit 58 gradually shortens, with time, the length of the trail 22a added to the particle 20a up to that time when the entire particle 20a enters the right margin area 64b from the display target area 62. In other words, the trail drawing unit 58 gradually shortens the length of the trail 22a across a plurality of App images 60 after the deletion of the particle 20a and deletes the trail 22a from the App image 60 after a predetermined time from the deletion of the particle 20a.

In addition, the trail drawing unit 58 starts a generation process of the trail 22b to be added to the particle 20b (for example, monitoring of the motion of the particle 20b and drawing of the trail 22b) when the entire particle 20a enters the right margin area 64b from the display target area 62, that is, when the entire particle 20b enters the display target area 62 from the left margin area 64a. The trail drawing unit 58 may detect that the entire particle 20b has entered the display target area 62 from the left margin area 64a when the left end coordinates of the particle 20b arranged by the particle drawing unit 56 coincide with the coordinate values of the left boundary of the display target area 62. The trail drawing unit 58 gradually increases the length of the trail 22b across a plurality of App images 60 after the entire particle 20b has entered the display target area 62 from the left margin area 64a, until the length reaches the maximum length set in advance.

The speed of the reduction of the trail 22a with respect to the particle 20a after the disappearance and the speed of the elongation of the trail 22b with respect to the particle 20b are the same. In other words, the trail drawing unit 58 elongates the trail 22b at the same speed as the speed of the reduction of the trail 22a. In this way, as for the sum of the trail 22a and the trail 22b, the maximum length of the trail set in advance is maintained.

Although the particle 20a moves to the right in the examples of FIGS. 4A to 4C, the right and the left are switched in the process when the particle 20a moves to the left. That is, when the particle 20a comes into contact with the boundary of the display target area 62 and the left margin area 64a, the particle drawing unit 56 arranges the particle 20b in the right margin area 64b such that the particle 20b comes into contact with the boundary of the display target area 62 and the right margin area 64b. The particle drawing unit 56 generates a plurality of App images 60 such that as the particle 20a moves out to the left margin area 64a from the display target area 62, the particle 20b enters the display target area 62 from the right margin area 64b.

In addition, the trail drawing unit 58 gradually shortens the trail object added to the particle 20a when the entire particle 20a enters the left margin area 64a from the display target area 62, that is, when the entire particle 20b enters the display target area 62 from the right margin area 64b. Along with this, the trail drawing unit 58 starts to generate a trail object to be added to the particle 20b.

According to the display apparatus 10 of the first embodiment, the margin areas are provided at both ends of the display target area 62, and as the particle 20 enters one of the margin areas, the replacing particle 20 appears from the other margin area. This can suppress the lag of display when the particle 20 crosses the boundary of the image (for example, when the particle 20 moves from the right end to the left end of the display target area 62), and the particle 20 can be displayed as if the particle 20 moves on a continuously connected surface. Similarly, this can suppress the lag of display when the trail 22 crosses the boundary of the image, and the trail 22 can be displayed as if the trail 22 moves on a continuously connected surface.

In addition, as described in relation to FIG. 4C, the generation process of the trail 22b added to the particle 20b is started when the entire particle 20b enters the display target area 62 from the left margin area 64a, and this can suppress the increase in the amount of calculation of the image generation unit 52. Furthermore, the width (horizontal width) of the left margin area 64a and the right margin area 64b is the same as the width (horizontal width) of the particle 20, and this can suppress the increase in the size of the App image 60 and suppress the increase in the amount of calculation of the image generation unit 52. Note that the technique described in the first embodiment is also useful when only one type of object (for example, particle 20) is moved on the App image 60.

Second Embodiment

Parts of the present embodiment different from the first embodiment will be mainly described, and common parts will not be described. In the description, the same reference signs are provided to the constituent elements of the present embodiment that are the same as or corresponding to the constituent elements of the first embodiment.

The external configuration of the display apparatus 10 of a second embodiment is the same as the external configuration of the display apparatus 10 of the first embodiment illustrated in FIG. 1. In addition, the functional blocks of the display apparatus 10 of the second embodiment are the same as the functional blocks of the display apparatus 10 of the first embodiment illustrated in FIG. 3.

The width of the particle 20 of the second embodiment is equal to or smaller than the width of the trail 22. The width in the second embodiment is the vertical width, that is, the length in the direction perpendicular to the movement direction of the particle 20. In addition, it is preferable that the color of the particle 20 in the second embodiment be the same color or a color similar to the color of the trail 22 (for example, a color at an adjacent or close position in the hue circle).

Figure 5A:
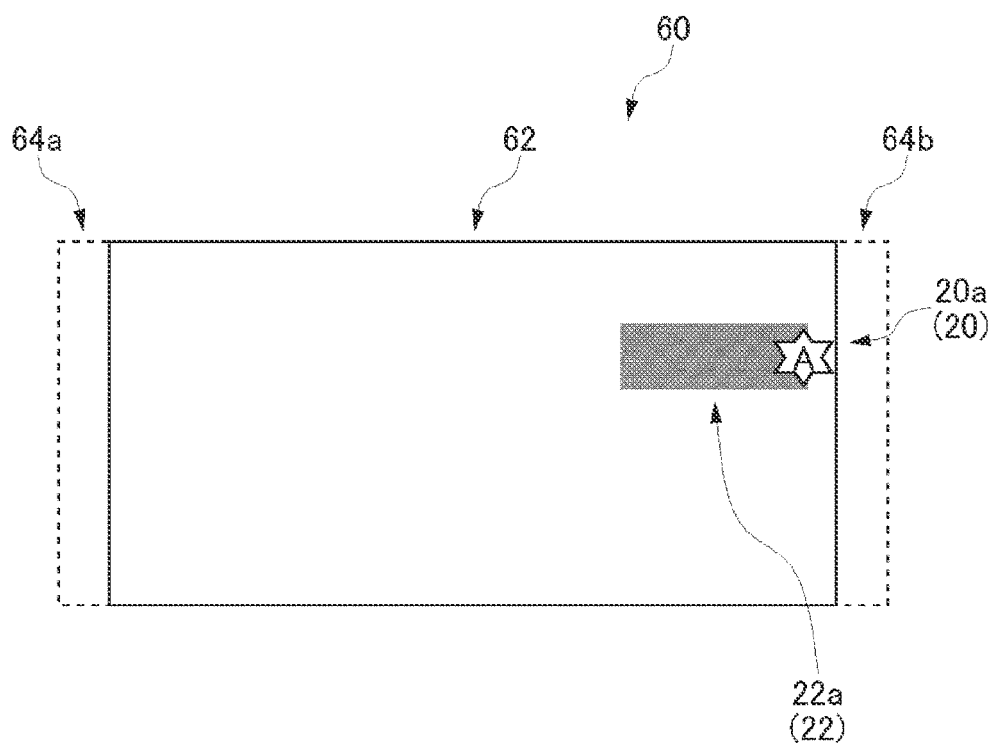
FIG. 5A is a diagram illustrating an example of the App image.
Figure 5B:
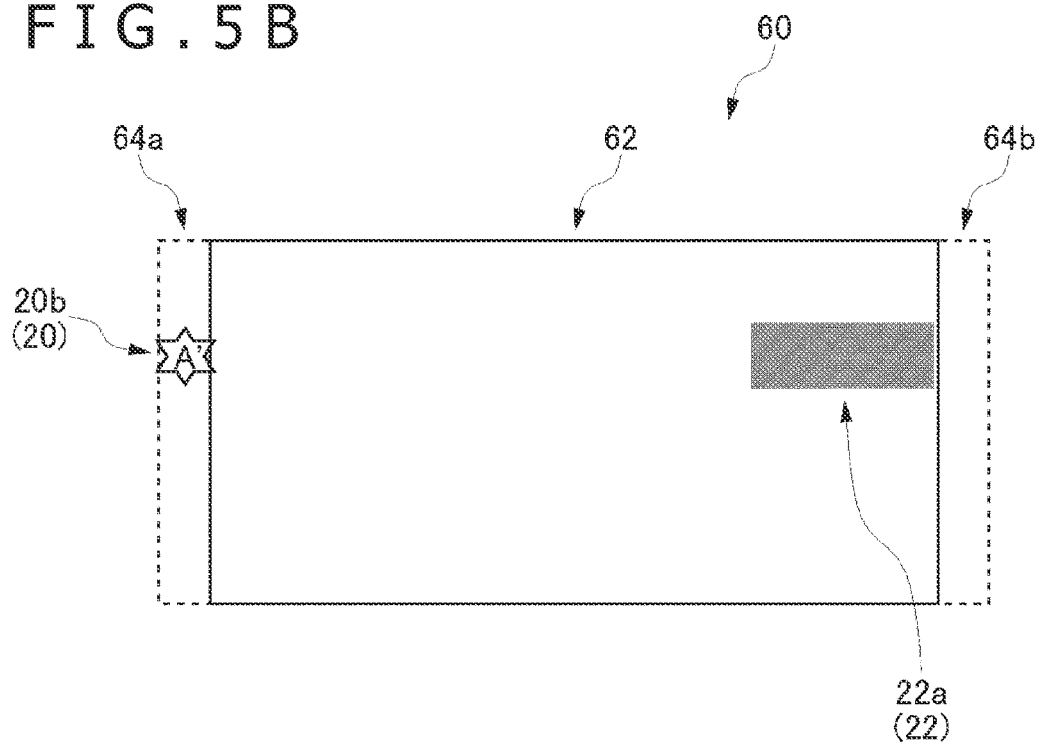
FIG. 5B is a diagram illustrating an example of the App image.

FIGS. 5A and 5B illustrate an example of the App image. When the particle 20a moving in the display target area 62 comes into contact with the boundary of the display target area 62 and the right margin area 64b as illustrated in FIG. 5A, the particle drawing unit 56 arranges the particle 20b in the left margin area 64a such that the particle 20b comes into contact with the boundary of the display target area 62 and the left margin area 64a as illustrated in FIG. 5B. Along with this, the particle drawing unit 56 deletes the particle 20a. In other words, the particle drawing unit 56 does not arrange the particle 20a in the App image 60 following FIG. 5A.

The trail drawing unit 58 turns off the monitor function for the particle 20a at the time that the particle 20a is deleted. However, the trail drawing unit 58 gradually shortens, with time, the trail 22a added to the particle 20a up to that time, across a plurality of App images 60 after the deletion of the particle 20a. Along with this, the particle drawing unit 56 draws the particle 20 such that the particle 20b gradually enters the display target area 62 from the left margin area 64a, across a plurality of App images 60 after the deletion of the particle 20a.

Figure 5C:
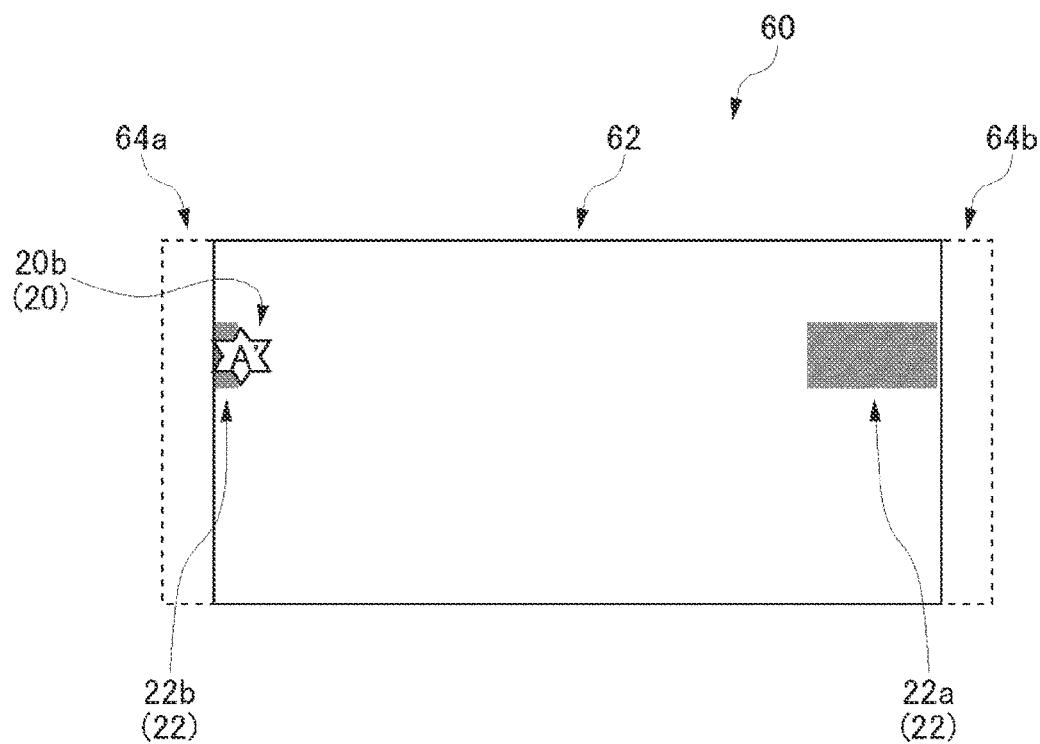
FIG. 5C is a diagram illustrating an example of the App image.

FIG. 5C also illustrates an example of the App image. As illustrated in FIG. 5C, the trail drawing unit 58 starts to generate the trail 22b to be added to the particle 20b when the entire particle 20b enters the display target area 62 from the left margin area 64a.

According to the display apparatus 10 of the second embodiment, when the size of the particle 20 is small and is equal to or smaller than the width of the trail 22, the particle 20 is not displayed in the display target area 62 for a short time as illustrated in FIG. 5B. However, the display of the trail 22 can compensate for the non-display of the particle 20. This can prevent the boundary of the image from becoming conspicuous, and the particle 20 and the trail 22 can be displayed as if the particle 20 and the trail 22 move on a continuously connected surface. In addition, the number of arranged particles 20 does not increase even temporarily in the display apparatus 10 of the second embodiment, and the increase in the amount of calculation of the image generation unit 52 can be suppressed.

The present invention has been described based on the first and second embodiments. The embodiments are illustrative, and those skilled in the art will understand that there can be various modifications for the combinations of the constituent elements and the processes and that the modifications are also within the scope of the present invention.

Figure 6:
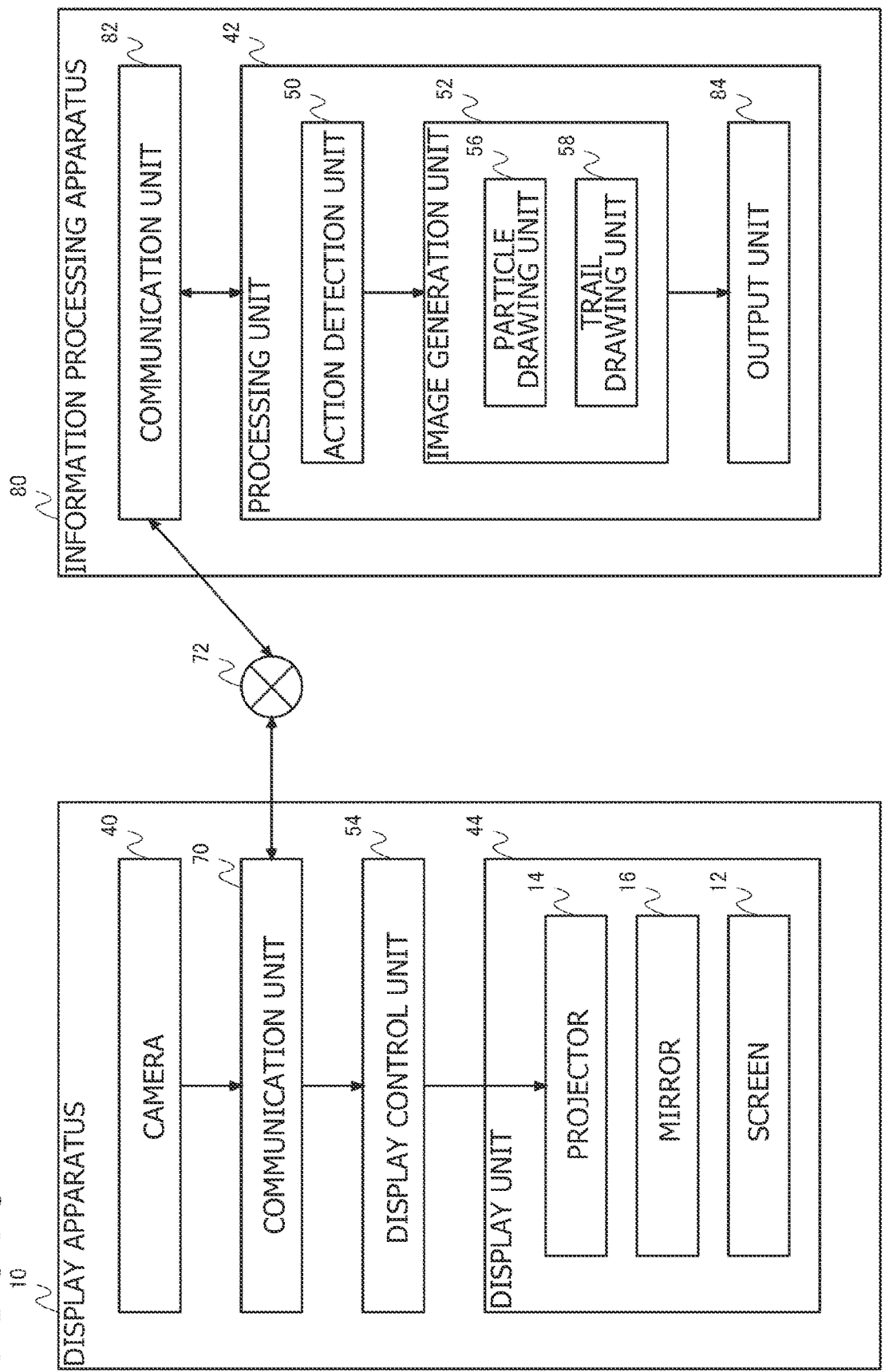
FIG. 6 is a diagram illustrating a configuration of a system of a modification.

Although the display apparatus 10 generates the image projected onto the screen 12 of the display apparatus 10 in the embodiments, an apparatus outside the display apparatus 10 may generate the image in a modification. FIG. 6 illustrates a configuration of a system of the modification. In the system, the display apparatus 10 includes a communication unit 70 in place of the image generation unit 52 of the embodiments. The communication unit 70 transmits a video of the user imaged by the camera 40 to an information processing apparatus 80 through a communication network 72 including a local area network (LAN), a wide area network (WAN), the Internet, or the like. In addition, the communication unit 70 receives data of an image (for example, the App image 60 of the embodiments) transmitted from the information processing apparatus 80 through the communication network 72. The display control unit 54 controls the projector 14 to cause the screen 12 to display the image transmitted from the information processing apparatus 80.

The information processing apparatus 80 may be a server or a personal computer (PC). The information processing apparatus 80 includes a communication unit 82 and the processing unit 42. The communication unit 82 inputs, to the processing unit 42, the video of the user transmitted from the display apparatus 10 and transmits, to the display apparatus 10, the image data that is output from the processing unit 42 and that is to be displayed on the screen 12 of the display apparatus 10. The processing unit 42 includes the action detection unit 50, the image generation unit 52, and an output unit 84. As already described in the embodiments, the functional blocks of the processing unit 42 may be implemented as computer programs.

The processes of the action detection unit 50 and the image generation unit 52 are similar to the processes in the embodiments, and the description will not be repeated. The output unit 84 outputs, to the communication unit 82, the content of at least the display target areas 62 of the plurality of App images 60 generated by the image generation unit 52 and transmits the content to the display apparatus 10 through the communication unit 82. The output unit 84 may transmit the content of the display target area 62 of the App image 60 to the display apparatus 10 or may transmit the entire App image 60 to the display apparatus 10. In the latter case, the display control unit 54 of the display apparatus 10 extracts the content of the display target area 62 of the App image 60 and causes the screen 12 to display the content. The configuration of a first modification can be applied to either one of the first embodiment and the second embodiment, and the system of the first modification attains the advantageous effects of each of the first embodiment and the second embodiment.

In addition, although not mentioned in the embodiments, the margin areas of the App image 60 may be provided above and below instead of the left and the right of the display target area 62, and the margin areas may also be provided above and below in addition to the left and the right of the display target area 62.

Any combination of the embodiments and the modification is also useful as an embodiment of the present disclosure. The new embodiment created by the combination has advantageous effects of both the combined embodiment and modification. In addition, those skilled in the art will also understand that the functions to be fulfilled by the constituent elements described in the claims are realized by individual constituent elements illustrated in the embodiments and the modification or by cooperation between the constituent elements illustrated in the embodiments and the modification.

INDUSTRIAL APPLICABILITY

The invention can be used for a display apparatus that displays an image on a cylindrical screen.

REFERENCE SIGNS LIST

10: Display apparatus
12: Screen
52: Image generation unit
54: Display control unit
56: Particle drawing unit
58: Trail drawing unit

The invention claimed is:
1. A display apparatus comprising:
a processor; and
a memory storing instructions which, when executed by the processor, cause the display apparatus to perform operations comprising:
generating an image provided with a movement object as an object that moves, the image including a display target area displayed on a cylindrical screen, a first margin area provided outside of one end of the display target area, and a second margin area provided outside of an end on an opposite side of the one end of the display target area; and
causing the cylindrical screen to sequentially display content of the display target area of a plurality of images, wherein,
when a first instance of the movement object that moves in the display target area comes into contact with a boundary of the display target area and the first margin area, a second instance of the movement object is arranged in the second margin area and in a same mode as a mode of the first instance of the movement object such that the second instance of the movement object comes into contact with a boundary of the display target area and the second margin area,
generating the plurality of images such that as the first instance of the movement object moves out to the first margin area from the display target area, the second instance of the movement object enters the display target area from the second margin area, and
the second instance of the movement object is a copied image of the first instance of the movement object, wherein a trail object indicating a trajectory of a movement of the movement object is arranged in the display target area, and when an entirety of the first instance of the movement object enters the first margin area from the display target area, the trail object added to the first instance of the movement object is shortened and a portion of a trail object to be added to the second instance of the movement object is generated.

2. The display apparatus according to claim 1, wherein widths of the first margin area and the second margin area are the same as a width of the movement object.

3. The display apparatus according to claim 1, wherein the cylindrical screen is a cylindrical transparent screen display configured to display a video using a hologram screen technique.

4. A display apparatus comprising:
a processor; and
a memory storing instructions which, when executed by the processor, cause the display apparatus to perform operations comprising:
generating an image provided with a movement object as an object that moves and a trail object indicating a trajectory of a movement of the movement object, the image including a display target area displayed on a cylindrical screen, a first margin area provided outside of one end of the display target area, and a second margin area provided outside of an end on an opposite side of the one end of the display target area; and
causing the cylindrical screen to sequentially display content of the display target area of a plurality of images, wherein
a width of the movement object is equal to or smaller than a width of the trail object,
when a first instance of the movement object that moves in the display target area comes into contact with a boundary of the display target area and the first margin area, a second instance of the movement object is arranged in the second margin area and in a same mode as a mode of the first instance of the movement object such that the second instance of the movement object comes into contact with a boundary of the display target area and the second margin area, and delete the first instance of the movement object, after deleting the first instance of the movement object, shortening the trail object added to the first instance of the movement object up to that time and generating a plurality of images such that the second instance of the movement object enters the display target area from the second margin area, when an entirety of the second instance of the movement object enters the display target area from the second margin area, a portion of a trail object to be added to the second instance of the movement object is generated, and the second instance of the movement object is a copied image of the first instance of the movement object.

5. The display apparatus according to claim 4, wherein widths of the first margin area and the second margin area are the same as a width of the movement object.

6. The display apparatus according to claim 4, wherein the cylindrical screen is a cylindrical transparent screen display configured to display a video using a hologram screen technique.

7. A display method executed by a display apparatus, the display apparatus executing:

generating an image provided with a movement object as an object that moves, the image including a display target area displayed on a cylindrical screen, a first margin area provided outside of one end of the display target area, and a second margin area provided outside of an end on an opposite side of the one end of the display target area; and causing the cylindrical screen to sequentially display content of the display target area of a plurality of images generated in the generating, wherein, in the generating, when a first instance of the movement object that moves in the display target area comes into contact with a boundary of the display target area and the first margin area, the display apparatus arranges, in the second margin area, a second instance of the movement object in a same mode as a mode of the first instance of the movement object such that the second instance of the movement object comes into contact with a boundary of the display target area and the second margin area, in the generating, the display apparatus generates the plurality of images such that as the first instance of the movement object moves out to the first margin area from the display target area, the second instance of the movement object enters the display target area from the second margin area, and the second instance of the movement object is a copied image of the first instance of the movement object, wherein a trail object indicating a trajectory of a movement of the movement object is arranged in the display target area, and when an entirety of the first instance of the movement object enters the first margin area from the display target area, the trail object added to the first instance of the movement object is shortened and a portion of a trail object to be added to the second instance of the movement object is generated.

8. The display method according to claim 7, wherein widths of the first margin area and the second margin area are the same as a width of the movement object.

9. The display method according to claim 7, wherein the cylindrical screen is a cylindrical transparent screen display configured to display a video using a hologram screen technique.

10. A display method executed by a display apparatus, the display apparatus executing:

generating an image provided with a movement object as an object that moves and a trail object indicating a trajectory of a movement of the movement object, the image including a display target area displayed on a cylindrical screen, a first margin area provided outside of one end of the display target area, and a second margin area provided outside of an end on an opposite side of the one end of the display target area; and sequentially displaying, on the cylindrical screen, content of the display target area of a plurality of images generated in the generating, wherein a width of the movement object is equal to or smaller than a width of the trail object, in the generating, when a first instance of the movement object that moves in the display target area comes into contact with a boundary of the display target area and the first margin area, the display apparatus is configured to arrange, in the second margin area, a second instance of the movement object in a same mode as a mode of the first instance of the movement object such that the second instance of the movement object comes into contact with a boundary of the display target area and the second margin area, and delete the first instance of the movement object, in the generating, after deleting the first instance of the movement object, shortening the trail object added to the first instance of the movement object up to that time and generates a plurality of images such that the second instance of the movement object enters the display target area from the second margin area, in the generating, when an entirety of the second instance of the movement object enters the display target area from the second margin area, the display apparatus starts to generate a trail object to be added to the second instance of the movement object, and the second instance of the movement object is a copied image of the first instance of the movement object.

11. The display method according to claim 10, wherein widths of the first margin area and the second margin area are the same as a width of the movement object.

12. The display method according to claim 10, wherein the cylindrical screen is a cylindrical transparent screen display configured to display a video using a hologram screen technique.

13. A non-transitory, computer readable storage medium containing a computer program, which when executed by a computer, causes the computer to perform a display method executed by a display apparatus by carrying out actions, comprising:

generating an image provided with a movement object as an object that moves, the image including a display target area displayed on a cylindrical screen, a first margin area provided outside of one end of the display target area, and a second margin area provided outside of an end on an opposite side of the one end of the display target area; and outputting, to a display apparatus including the cylindrical screen, content of at least the display target area of a plurality of images generated in the generating, wherein, in the generating, when a first instance of the movement object that moves in the display target area comes into contact with a boundary of the display target area and the first margin area, the computer arranges, in the second margin area, a second instance of the movement object in a same mode as a mode of the first instance of the movement object such that the second instance of the movement object comes into contact with a boundary of the display target area and the second margin area, in the generating, the computer generates the plurality of images such that as the first instance of the movement object moves out to the first margin area from the display target area, the second instance of the movement object enters the display target area from the second margin area, and the second instance of the movement object is a copied image of the first instance of the movement object, wherein a trail object indicating a trajectory of a movement of the movement object is arranged in the display target area, and when an entirety of the first instance of the movement object enters the first margin area from the display target area, the trail object added to the first instance of the movement object is shortened and a portion of a trail object to be added to the second instance of the movement object is generated.

14. The non-transitory, computer readable storage medium according to claim 13, wherein widths of the first margin area and the second margin area are the same as a width of the movement object.

15. The non-transitory, computer readable storage medium according to claim 13, wherein the cylindrical screen is a cylindrical transparent screen display configured to display a video using a hologram screen technique.

16. A non-transitory, computer readable storage medium containing a computer program, which when executed by a computer, causes the computer to perform a display method executed by a display apparatus by carrying out actions, comprising:

generating an image provided with a movement object as an object that moves and a trail object indicating a trajectory of a movement of the movement object, the image including a display target area displayed on a cylindrical screen, a first margin area provided outside of one end of the display target area, and a second margin area provided outside of an end on an opposite side of the one end of the display target area; and outputting, to a display apparatus including the cylindrical screen, content of at least the display target area of a plurality of images generated in the generating, wherein a width of the movement object is equal to or smaller than a width of the trail object, in the generating, when a first instance of the movement object that moves in the display target area comes into contact with a boundary of the display target area and the first margin area, the computer is configured to arrange, in the second margin area, a second instance of the movement object in a same mode as a mode of the first instance of the movement object such that the second instance of the movement object comes into contact with a boundary of the display target area and the second margin area, and delete the first instance of the movement object, in the generating, after deleting the first instance of the movement object, the trail object added to the first instance of the movement object up to that time is shortened and a plurality of images is generated such that the second instance of the movement object enters the display target area from the second margin area, in the generating, when an entirety of the second instance of the movement object enters the display target area from the second margin area, a portion of a trail object to be added to the second instance of the movement object is generated, and the second instance of the movement object is a copied image of the first instance of the movement object.

17. The non-transitory, computer readable storage medium according to claim 16, wherein widths of the first margin area and the second margin area are the same as a width of the movement object.

18. The non-transitory, computer readable storage medium according to claim 16, wherein the cylindrical screen is a cylindrical transparent screen display configured to display a video using a hologram screen technique.

* * * * *